Feb. 14, 1956 R. T. SAVAGE ET AL 2,734,805
GAS CONTACTING AND DISENGAGING APPARATUS
Filed Sept. 21, 1951 3 Sheets-Sheet 1

CATALYST TO
REGENERATION

INVENTORS
Reuben T. Savage &
Reyner Kollgaard
BY William P. Dahlander
ATTORNEY

Feb. 14, 1956  R. T. SAVAGE ET AL  2,734,805
GAS CONTACTING AND DISENGAGING APPARATUS
Filed Sept. 21, 1951  3 Sheets-Sheet 2

INVENTORS
Reuben T. Savage &
Reyner Kollgaard
BY William Klabunde
ATTORNEY

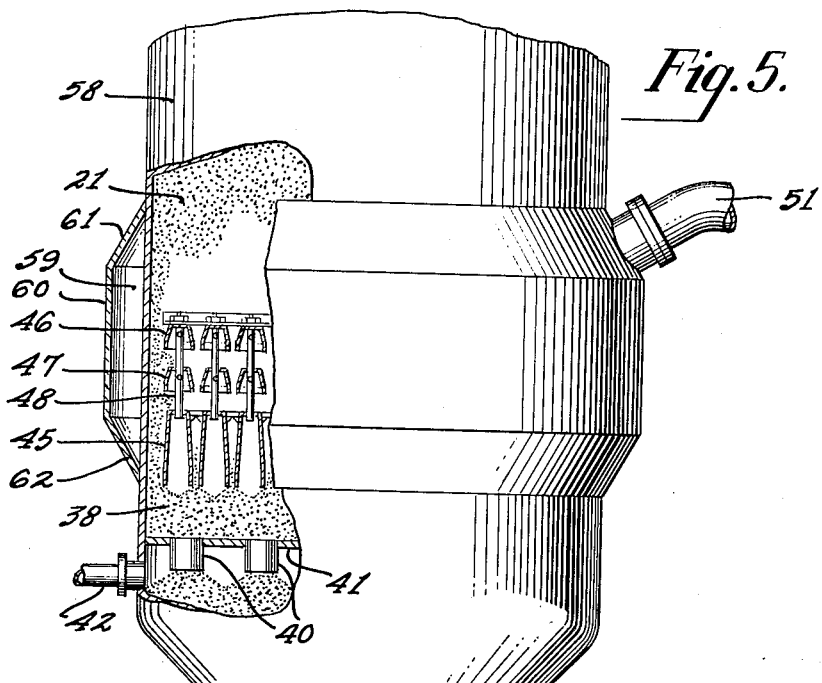
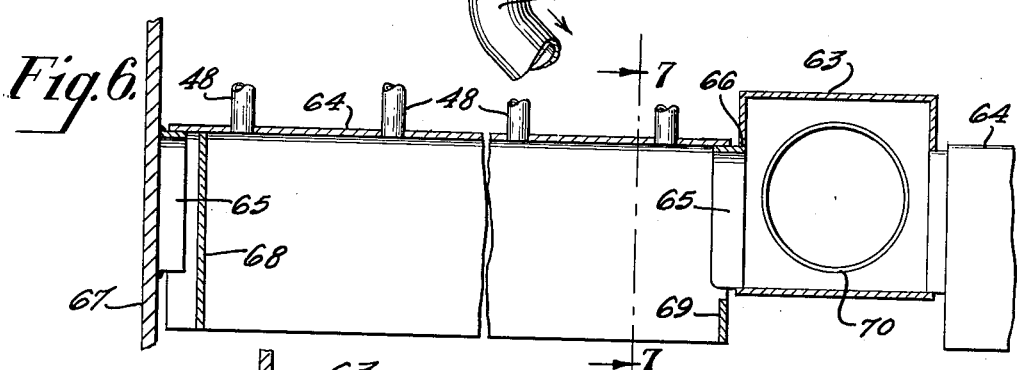
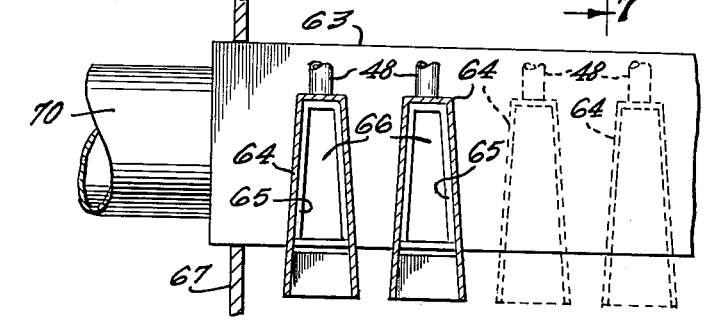
INVENTORS
Reuben T. Savage &
Reyner Kollgaard
BY William Klabunde
ATTORNEY United States Patent Office 2,734,805
Patented Feb. 14, 1956

2,734,805

GAS CONTACTING AND DISENGAGING APPARATUS

Reuben T. Savage, Ridley Park, and Reyner Kollgaard, Media, Pa., assignors to Houdry Process Corporation, Wilmington, Del., a corporation of Delaware Application September 21, 1951, Serial No. 247,684

14 Claims. (Cl. 23—288)

This invention relates in general to a method for disengaging gaseous material from a downwardly moving compact mass of fluent solid particles, and particularly to a method adapted for use in hydrocarbon conversion processes involving the contact of gaseous hydrocarbon material with granular contact material, such as catalyst, gravitating as a compact moving bed.

Considerable advantages are obtained in the use of granular catalyst in the form of a compact moving bed for the catalytic conversion of hydrocarbons within a reaction zone, particularly by reason of the continuous nature of the process, but at the same time several problems are created, arising particularly from certain inherent characteristics of such processes and from the characteristics of such solid particles while flowing as a compact mass. One such problem, involving the disengagement of gaseous material flowing concurrently through a downwardly moving bed of fluent solid particles within a contact zone, may be overcome by use of the method of the present invention.

The general technique for using downwardly moving non-turbulent compact beds of fluent solid particles as contact masses is set forth in the technical literature. For example, an article entitled "The 'T. C. C.' cracking process for motor gasoline production" by R. H. Newton, G. S. Dunham and T. P. Simpson, "Transactions of the American Institute of Chemical Engineers," volume 41, page 215, April 25, 1945, discusses its application to the catalytic cracking of hydrocarbons, and an article entitled "Thermofor pyrolytic cracking" by S. C. Eastwood and A. E. Potas, "Petroleum Processing," vol. 3, page 837, September 1948, discusses its application to the use of fluent inert solid particles for effecting pyrolytic conversions.

The disengagement of concurrently flowing gas from such downwardly moving beds of fluent particles normally involves the formation of free surfaces of particles, usually called "disengaging surfaces," and a reversal of gas flow in order that the gas may be disengaged from the particles by passing upwardly through the free surfaces so formed. The velocity of the gas at the level of disengagement is maintained at a value which will prevent excessive particle entrainment in the gaseous material rising from the disengaging surfaces.

It has been found desirable in certain processes to pass the gas concurrently downwardly through the moving contact mass at relatively high velocities. Such gas velocities may be of a magnitude which, if the gas were to be passed upwardly, would produce a serious disturbance of particle flow, such as a cessation of solids flow, a disruption of the compact bed as a result of turbulence, or channeling of the gas through the bed. These have been discussed in U. S. Patents No. 2,439,348, issued April 6, 1948, to T. P. Simpson et al. and No. 2,526,625, issued October 24, 1950, to D. B. Ardern, both of which involve concurrent flow of gaseous material through a compact moving bed, with disengagement of the gaseous material from the solids in the lower region of the bed.

The cited patents point out the advantages of a multistage disengagement in which the disengaging surfaces at the several levels of disengagement provide a substantially greater total area than the horizontal cross-sectional area of the bed of contact material within the main portion of the contact zone, whereby disengagement of the gas from the solids may be effected without substantial entrainment of the solid particles within the disengaged gas stream.

The present invention may be used to particular advantage in processes and systems in which relatively high gas velocities are employed and for this reason it is applicable to a wide variety of processes. For convenience of illustration, and for the sake of brevity, the present invention will hereinafter be particularly described in connection with a catalytic cracking process for the conversion of hydrocarbons. From the description, it will be obvious to those skilled in the art that the invention is of broader application, and may readily be applied to other fields and uses.

The problem of high gas or vapor velocities is especially important when hydrocarbon cracking systems or processes are operated at relatively high catalyst-to-oil ratios, such as in excess of 4, and for example from about 5–20. Such catalyst-to-oil ratios make it desirable to employ higher space velocities than are commonly employed in moving bed systems, for equal conversions. It is generally understood that, when the space velocity is relatively high, the volume of catalyst present in the conversion zone is relatively small. When space velocities in excess of 1, such as from about 2–10, are used, this effect must be given consideration in designing converter or reactor vessels.

To illustrate some of the problems involved, if a small amount of catalyst is arranged in the form of a deep bed of small horizontal cross-sectional area, the pressure drop through such bed will be impractically high. On the other hand, if a relatively shallow bed of large horizontal cross-sectional area is employed, and the solid particles are fed to the upper surface of the bed, in one or more compact moving columns, the consequent uneven surface or profile of the bed will cause inequalities of considerable magnitude in the space velocities through various portions of the bed, with resultant inefficiency and mechanical disturbance in operation.

In the case of a shallow catalyst bed, it is desirable to avoid a condition where the amount of catalyst is sufficient only to fill the disengaging section. Furthermore, shallow catalyst beds require precision in fixing the bed depth and the exercise of a careful control of bed level in order to obtain the desired space velocity and conversion. In view of the above considerations, catalyst beds of intermediate horizontal cross-section area are most desirable. In order to avoid entrainment of the solid particles in the disengaged gases when high gas velocities are employed, it is generally necessary to provide a total disengaging surface which is substantially greater than the horizontal cross-sectional area of the catalyst bed in the main bottom portion of the conversion zone.

As explained in the cited patents, suitable catalyst disengaging surfaces throughout the bed may be developed by employing inverted troughs, the troughs being arranged in groups at a plurality of vertically-spaced levels. This is commonly known as multi-level disengagement.

One of the problems encountered in multi-level disengagement, especially where high vapor flow rates are employed in converters having a relatively small horizontal cross-sectional area, is that so many vertically spaced groups of inverted troughs must be used, that disengagement of the gaseous material from the catalyst starts at a high level within the catalyst bed. In such cases, the total hydrocarbon vapors traverse only a relatively small portion of the total bed depth before a portion of the vapors is disengaged from the catalyst particles, with consequent cessation of conversion reaction with respect to that portion. Such condition is preferably to be avoided, since it is obviously desirable from the standpoint of obtaining uniformity of conversion conditions to have as much of the vapors as possible contact the entire catalyst bed. In any case, it is highly desirable to effect disengagement of the gaseous material from the catalyst particles within a minimum vertical distance so as to obtain a substantial saving in vertical height of the vessel containing the conversion zone, which saving may effect a substantial reduction in the cost of the vessel, its supporting structure, and its service lines.

A further problem encountered in the use of such disengagers is that of support for the various structural elements of the disengager section and for the bed of catalyst surrounding and covering the disengager elements. In addition to the weight of the disengager apparatus and the weight of the catalyst bed, there are additional downward forces such as those exerted by the pressure of the downwardly flowing gaseous material, and resulting from the movement of the bed. In present vessels of commercial size, these various forces are great enough to require substantial beam support throughout the disengager section in order to carry the structural load, the catalyst load, and the pressure drop load through the catalyst bed. Such beam supports complicate the internal structure of the vessel, add to the height requirements thereof, and are expensive.

In accordance with the present invention, the disadvantages of excessive vertical height of the disengager section, complicated structure, and extensive beam support are overcome by a simple compact design and arrangement of the disengager section which substantially lowers the vertical height requirements through the disengager section, eliminates or minimizes the need for beam support, and effects considerable savings in the cost of construction. Attainment of the foregoing is effected by disengaging the gaseous material from the catalyst at a plurality of levels in the lower region of the contact or conversion zone, the lowermost disengaging level representing the bottom of the conversion zone. The gas disengaged at the various upper disengaging levels is collected separately at each level and is conveyed along confined paths into a plurality of horizontally spaced parallel confined paths extending across the bottom of the conversion zone and constituting the lowermost disengaging level, the latter paths in cross-section having a relatively high ratio of height to width, in order that their cross-sectional flow area will be sufficient to convey the gaseous material at a velocity which will not be sufficient to cause solids entrainment, and in order that a maximum number of such paths may be accommodated across the bottom of the conversion zone.

In a preferred embodiment of the invention the catalyst passes downwardly through the narrow spaces between said horizontal paths in the form of compact moving columns extending the full width of the conversion zone, the narrowest horizontal dimension of the columns being sufficient to prevent bridging of the catalyst or other disturbance of flow, and to maintain the pressure drop of gaseous material flowing downwardly through the moving columns within desired limits. The devices for confining the flow of catalyst into the narrow paths terminate at a common level coincident with the bottom of the conversion zone, the downwardly moving columns of catalyst being free to expand laterally to form a single compact moving bed contiguous to the compact columns and having upper exposed surfaces in open communication with the horizontal gas conducting passages.

The horizontal gas conducting passages are in open communication at their ends with an external plenum or manifold chamber adjacent to the lower periphery of the conversion zone. All the disengaged gas, substantially free of entrained particles, is conveyed along the aforementioned horizontal confined paths into the plenum or manifold chamber, from which it is discharged and conveyed to other treating sections of the system.

The structural elements which provide the horizontal confined paths are in the form of relatively deep inverted channels through which the disengaged gases are conveyed laterally out of the conversion chamber, and between which the catalyst particles gravitate as a plurality of narrow, horizontally elongated, compact columns. The ends of the inverted deep-channel members extend to and through the side walls of the vessel containing the contact zone, and are in open comunication with the plenum. Preferably, the sides of the deep inverted channels diverge outwardly toward the bottom, and are of suitable depth and thickness to provide the rigidity necessary to support both the weight of he entire disengager unit and the weight of the bed of catalyst maintained within the conversion zone, together with the downward force exerted by the flow of gas concurrently with the compact moving bed.

In certain cases, as where there is a long span across the reaction or contact zone, the sides of the channels may be of a depth greater than that required to provide the necessary cross-sectional flow area for the disengaged gases because of the need for additional structural support. In other cases the sides of the channels may be of a depth greater than that required to provide the necessary rigidity, in order that the cross-sectional flow area through the channel will be sufficiently great to remove all of the gases at a velocity insufficient to cause substantial entrainment of the catalyst. In other words, both rigidity of the side walls of the channel members and cross-sectional flow area through the channels are important factors in determining the size and proportion of the disengager elements.

For a clearer understanding of the invention, reference may be had to the accompanying drawing forming a part of this application, in which:

Fig. 5 is a fragmentary sectional view in elevation showing a modification of the vessel and disengaging section illustrated in Fig. 1;

Fig. 6 is an enlarged fragmentary sectional view showing another arrangement of apparatus which may be substituted for the deep channel disengager elements and the plenum or manifold chamber of Fig. 1; and, Fig 7 is a sectional view taken along the line 7—7 of Fig. 6.

Figure 1:
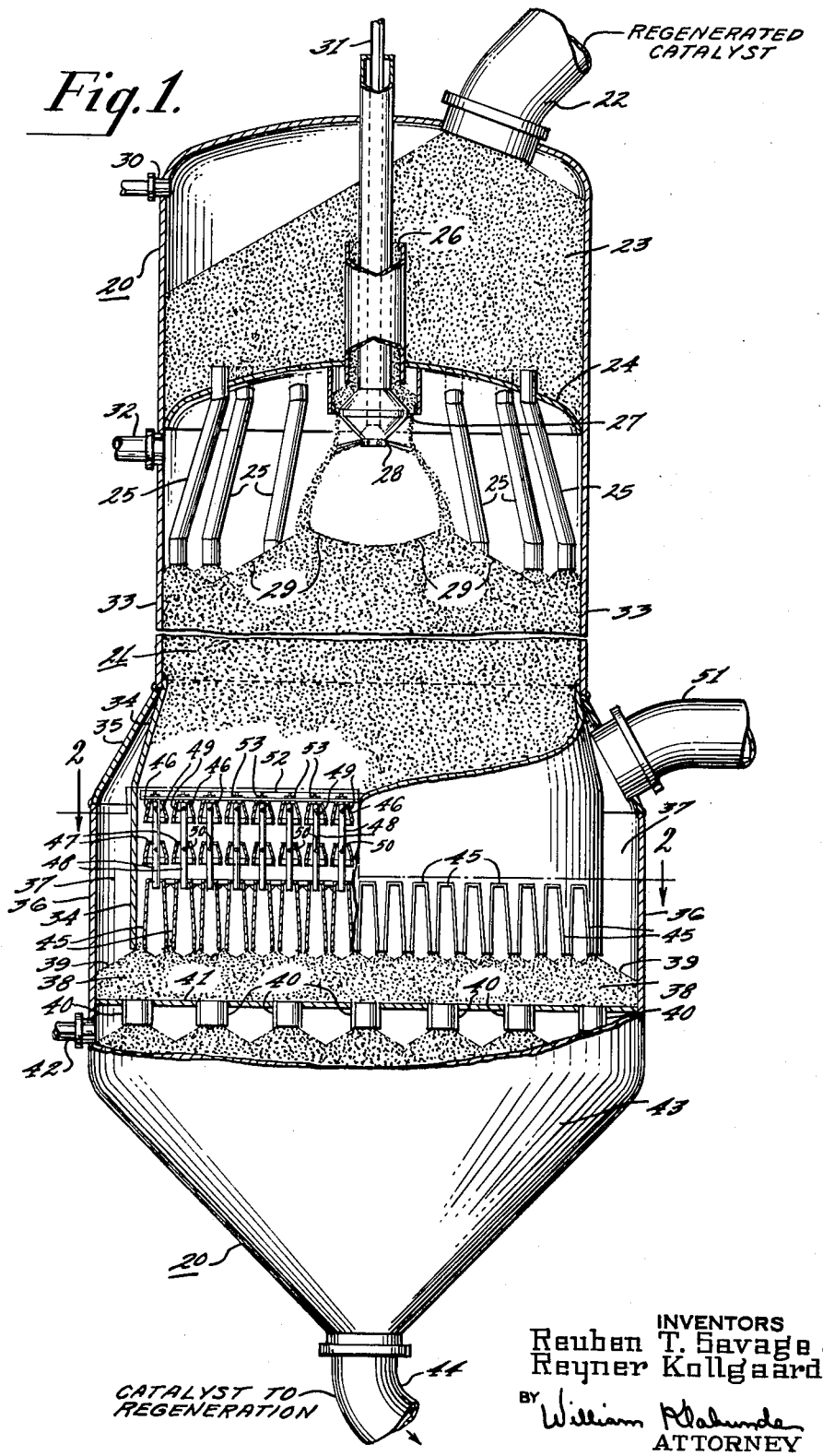
Fig. 1 is an elevational view, in partial section, of a vessel adapted for contacting a downwardly moving bed of solid particles with gases, portions of the vessel being broken away to clearly show the internal portions of the apparatus.

Referring to the drawings, Fig. 1 shows a closed housing or vessel, generally indicated by the numeral 20, comprising a contact chamber or zone containing a downwardly moving bed 21 of solid catalyst particles. The fluent solid, particles, ranging in size between 1 to 15, and preferably about 2 to 8 millimeters in diameter, and comprising freshly regenerated solid hydrocarbon conversion catalyst, such as acid-activated montmorillonite clay, synthetic silica-alumina gel, or other solid refractory compositions in pellet or bead form known by those skilled in the art to be suitable as hydrocarbon cracking catalysts, is introduced from a storage hopper, not shown, into the upper end of housing 20 through seal leg conduit 22. The introduced catalyst flows as a compact moving bed of catalyst 23 within a catalyst introduction, distributing, or sealing chamber formed between the upper end of the housing 20 and a baffle or tube sheet 24 extending across the housing, as shown. The catalyst flows downwardly from bed 23 in the distributing chamber to bed 21 in the contact chamber through an annular row of downcomer conduits 25 having their upper ends set in the tube sheet 24, and through centrally located annular passageways 26 and 27. The catalyst particles introduced through annular passageways 26 and 27 descend within the contact chamber as a freely falling curtain past liquid hydrocarbon injection nozzle 28 to the surface of bed 21, the upper surface or profile of which is approximately indicated by dotted lines 29. All the particles introduced through conduits 25 and through passageways 26 and 27 combine to form the compact non-turbulent bed 21 gravitating through the contact zone. A sealing gas, such as steam, inert flue gas or the like is introduced into the catalyst-free space at the top of the distributing or sealing chamber above bed 23 through conduit 30 at a pressure above the pressure maintained within the cracking or contact zone. Part of the sealing gas flows upwardly through the seal leg or compact column of particles gravitating through conduit 22. The remainder of the sealing gas flows downwardly through conduits 25, 26 and 27 thereby preventing migration therethrough of gaseous hydrocarbons from the cracking zone to the distributing or sealing chamber.

A charge stock of liquid hydrocarbons is introduced to the cracking zone through conduit 31 and nozzle 28, the liquid hydrocarbons being sprayed as an atomized stream onto the particles comprising the aforementioned freely falling curtain, which particles are at a substantially higher temperature than the temperature of the liquid hydrocarbon charge stock. If desired, additional hydrocarbons in vapor form may be introduced into the cracking zone through conduit 32. All the hydrocarbon vapors, whether introduced through conduit 32 or formed within the contact chamber by contact of the liquid hydrocarbon charge stock with the particles of catalyst in the falling curtain pass downwardly in the contact chamber or cracking zone through the bed 21, the hydrocarbon vapors flowing concurrently with the particles of catalyst. In known manner, conditions are maintained within the cracking zone suitable for the cracking or other conversion of the hydrocarbon vapors.

The downwardly moving catalyst bed 21 within the contact chamber or cracking zone is confined laterally by the wall or shell of housing 20. In the embodiment illustrated in Figs. 1 and 2, the upper portion of the bed 21 is confined by a cylindrical wall portion 33, and the lower portion of the bed is confined by an expanded skirt portion 34 comprising an upper swaged portion of frusto-conical shape and a lower cylindrical portion. The upper end of the swaged portion of skirt 34 is joined, as by welding, to the lower end of the cylindrical wall portion 33. Since the lower region of the contact zone, embraced within the lower cylindrical portion of the skirt 34, has a greater horizontal cross-sectional flow area than the upper region of the contact zone, embraced within the cylindrical wall 33, the bed 21 expands as it flows through the lower region of the contact zone. Sufficient space is thereby provided for the disengaging members, hereinafter to be described, without undesirably restricting the available flow area for the bed 21 in the bottom of the contact zone. If desired, however, the contact chamber may be of uniform cross-sectional flow area throughout its length, the bed 21 being laterally confined by a cylindrical shell or housing, as shown in Fig. 5. Referring again to the embodiment of the invention illustrated in Fig. 1, the angle of the frusto-conical swaged portion of skirt 34 to the horizontal is greater than the angle of repose of the mass of solid catalyst particles, and is preferably great enough to insure uniform flow of that portion of bed 21 contained in the region of the contact zone above the skirt 34. Preferably, such angle is in the order of about 70°, or greater.

The wall or shell of housing 20 below the level at which the contact zone begins to expand outwardly, by reason of the swaged upper portion of the skirt 34, comprises a second swaged frusto-conical portion 35 joined along its upper edge to the outer surface of the cylindrical portion 33 adjacent the juncture of the latter with the skirt member 34. The frusto-conical portion 35, as illustrated in the embodiment shown in Fig. 1, is substantially vertically coextensive with the frusto-conical portion of skirt 34. The frusto-conical portion 35, however, forms an angle to the horizontal less than the angle formed by the frusto-conical portion of the skirt, so that the lower end of the former is spaced a substantial distance outwardly from the lower end of the latter. Below frusto-conical portion 35 the wall of housing 20 comprises a cylindrical portion 36 spaced concentrically outwardly from the skirt member 34. The cylindrical portion 36 extends downwardly a substantial distance below the lower end of the skirt 34, thereby forming a laterally confined zone of substantially increased cross-sectional flow area about and below the lower end of the contact zone. In other words, vessel 20 comprises an upper cylindrical section, expanded at its lower end, and a lower cylindrical section, of substantially greater diameter than the upper section, having its upper end portion surrounding and concentrically spaced from the expanded lower portion of the upper section. The upper end portion of the lower section is turned inwardly and is joined to the outer wall of the upper section, thereby providing an annular peripheral plenum or manifold chamber 37 about the lower end of the upper section.

The catalyst discharging from the bed confined by the lower end of skirt 34, flows downwardly as a moving mass which simultaneously expands outwardly to form a compact moving bed 38 laterally confined by the cylindrical portion 36 of the lower housing section. The annular portion of the bed 38 which flows outwardly from the lower perimeter of skirt 34 has an upper exposed surface indicated in Fig. 1 by the dotted lines 39, which forms the lowermost boundary of manifold chamber 37. The catalyst is discharged from the bottom of compact moving bed 38 through downcomer conduits 40 having their upper ends set in a baffle or tube-sheet 41 which supports the bed 38. Conduits 40 are uniformly distributed in the tube-sheet 41.

At the surface level of bed 38, and at a plurality of exposed surface levels above this level and within the lower region of the contact zone, the gaseous material flowing concurrently through the downwardly moving bed 21 is disengaged from the solid particles of catalyst, in a manner hereinafter to be described. The compact moving bed 38 forms a convenient location for purging the particles of catalyst of additional vaporizable hydrocarbons by the introduction of steam or other purge gas. Accordingly, purge gas is introduced by conduit 42 beneath the tube sheet 41 for countercurrent flow through the descending columns of catalyst in conduits 40 and through the gravitating bed 38. The purge gas together with the displaced hydrocarbons rises to the exposed surfaces of bed 38, where it admixes with the other gaseous hydrocarbon material disengaged at this level and the gaseous material disengaged at the upper levels of disengagement and conveyed to the lowermost level. The purged particles of catalyst discharging downwardly from the lower ends of conduits 40 form a compact moving bed having its upper surface determined by the discharge level of the conduits 40. The space between the surface of the latter bed and the tube-sheet 41 provides a plenum for the introduction of the purge gas. The purged catalyst is discharged from the conical bottom portion 43 of housing 20 through conduit 44. Uniform withdrawal and smooth flow of the particles through conical portion 43 may be achieved by devices known to the art, such as that described in U. S. Patent No. 2,412,136, issued on December 3, 1946, to L. P. Evans et al. Conduit 44 conveys the purged spent catalyst particles to a regeneration system of known design wherein the carbonaceous deposit formed on the catalyst particles within the contact zone is removed by combustion with the aid of oxygen-containing gas. After suitable regeneration, the particles of catalyst are returned in known manner to the storage hopper, not shown, from which they are again passed to the vessel 20 through conduit 22.

Figure 3:
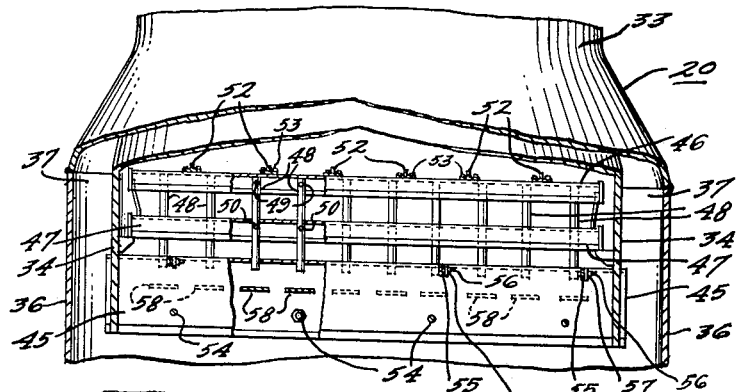
Fig. 3 is a fragmentary vertical section of the disengaging elements shown in Fig. 1, taken at a right angle to the section plane of Fig. 1.
Figure 4:
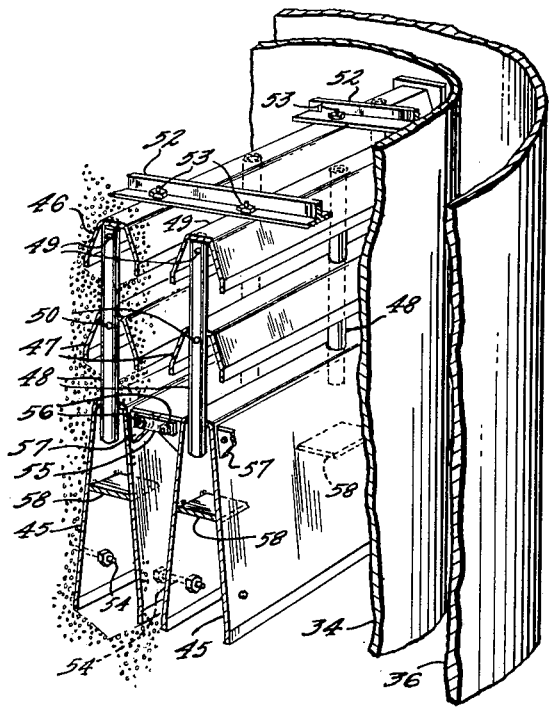
Fig. 4 is an enlarged fragmentary isometric view showing the construction and arrangements of the disengaging elements illustrated in Figs. 1, 2 and 3.

As previously stated, the gaseous hydrocarbon material flowing concurrently through the bed 21 within the contact zone is disengaged from the catalyst particles at the lower end thereof. For this purpose a disengager device is placed within the skirt portion at the bottom of the cracking or contact zone, the disengager unit extending upwardly into the lower region of the bed 21. As shown in Figs. 1, 3 and 4 the disengager comprises a plurality of inverted channels 45, the depth of the channels being relatively great in comparison to their average width, and the width of the channels increasing outwardly toward the mouth.

A channel of such configuration has the dual advantage of providing sufficient cross-sectional flow area to pass a considerable quantity of gas horizontally across the portion of the exposed surface of the bed of particles 38 immediately beneath the channel, without adversely disturbing such surface by entrainment of the particles, while at the same time providing an efficient support member for the load on the channel, as well as for the load on the disengager structure supported therefrom and extending upwardly into the bed 21. The substantial strength of the deep channel member as a support arises from the fact that the side walls of the channel are of considerable area and extend upward to a considerable height, which height is several times, such as from about 3-10, the average width of the channel.

Figure 2:
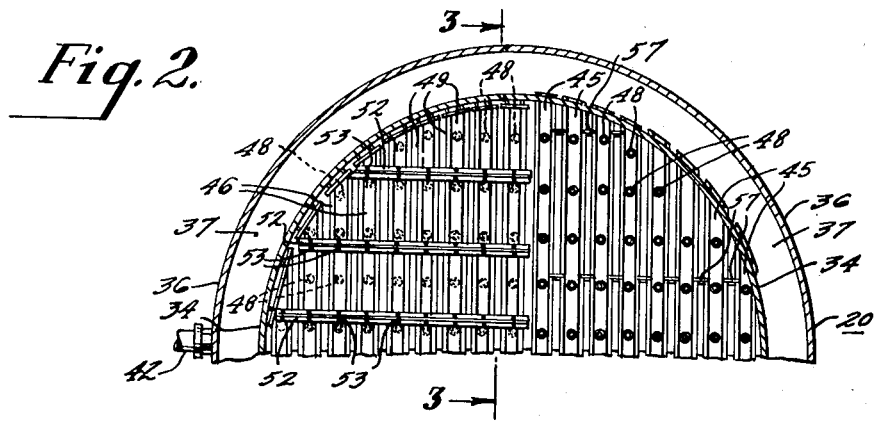
Fig. 2 is a horizontal transverse section of the vessel of Fig. 1, taken along the lines 2—2 and showing the arrangement of the portions of the apparatus at this level.

Channels 45, as shown in Figs. 2 and 3, are parallel and laterally spaced, and they extend horizontally across the bottom of the contact zone to and through the skirt member 34, to which the ends of the channels 45 are rigidly attached, as by welding. The solid particles of cracking catalyst in bed 21 pass downwardly through the parallel spaces separating channels 45 as a plurality of narrow compact streams or columns of particles. The streams emerging from the lower end of such spaces expand beneath the open lower ends of channels 45 to form the expanded bed 38. The solid particles flowing beneath the channels 45 form exposed disengaging surfaces inclined at the angle of repose for the particular particles. The exposed surfaces form the lowermost boundary of the particle-free spaces under the channels, and provide disengaging surfaces from which gaseous material may be discharged into the channels. Channels 45 have open ends which communicate directly with plenum or manifold chamber 37, thus providing continuous gaseous communication without substantial entrainment of solid particles between the exposed disengaging surfaces of the bed 38 and the peripheral plenum or manifold 37.

At a plurality of vertically-spaced levels within the portion of bed 21 above the channels 45, a plurality of baffles or deflectors in the form of inverted troughs are distributed horizontally across the bed, so as to divert the downward flow of solid particles and to create below the troughs a plurality of exposed surfaces of said particles inclined at the angle of repose. Beneath each trough there is formed a particle-free space for collecting gaseous material disengaged at the exposed surface forming the lowermost boundary of said space. In the embodiment illustrated in Figs. 1, 3 and 4, inverted troughs at the uppermost disengaging level are designated by the numeral 46, and the troughs at the disengaging level next below are designated by the numeral 47. Troughs 46 and 47 are closed at their ends, thus forming enclosed particle-free gas-collecting spaces under the troughs, which spaces have their lowermost boundary formed by internal exposed surfaces of the bed 21 which slope downwardly and inwardly from the lower perimeter of the troughs.

A plurality of vertical conduits 48 are set at their lower ends in the top of channels 45, and extend upwardly within bed 21, through the troughs 47, and through the hollow spaces below troughs 46. The upper ends of conduits 48 are attached to the underside of troughs 46, and the troughs 47 are rigidly secured to the conduits 48, thereby forming a unitary structure in which conduits 48, troughs 46, and troughs 47 are all supported by the deep channel members 45. In order to effect a maximum disengaging capacity beneath each level of troughs 46 and 47, a relatively rapid flow of solids is provided directly below the center of each trough. To maintain such rapid flow, the vertical spacing of troughs along each vertical conduit 48 is relatively large. For example, a vertical spacing in the order of about 9–18 inches will normally provide the desired flow. Conduits 48 communicate with the spaces under troughs 46 and 47, by means of orifices 49 and 50, respectively, the openings being sized to pass a predetermined portion of the total gas.

At the top level of disengagement, gas collected beneath troughs 46 flows into conduits 48 through orifices 49. At the next lower level of disengagement, gas collected beneath troughs 47 flows into conduits 48 through orifices 50. Conduits 48 convey the collected gaseous material downwardly into the hollow spaces within the deep channels 45, from which spaces it flows laterally into the plenum 37. Orifices 49 and 50 together pass only a portion of the total gaseous material; a remaining and substantial portion continues to flow concurrently with the solids on either side of channels 45 and is disengaged from the solids at the disengaging level defined by the lower edges of channels 45. Orifices 50 are larger than orifices 49, by reason of pressure drop considerations.

Each disengaging level provided by troughs 46 and 47 and by channels 45 carries a substantial share of the total disengaging load, preferably an approximately equal share. There is thus a progressive disengagement of gaseous material through and to the lowermost extremity of the disengager section, which extremity is coincident with the bottom of the contact zone. The entire disengager structure is therefore wholly contained within the contact zone, and does not extend below the lowermost limit thereof. The considerable disengaging surface provided by the close spacing of deep channels 45 and the length of disengaging perimeter provided by lower end configuration of the channels provides a maximum disengaging capacity, so that total disengagement may be effected in a region of minimum vertical extent. All the gas disengaged under the troughs and channels is therefore either initially collected within or subsequently conveyed into the deep channels 45, from which it flows laterally into the annular plenum space 37 formed between the skirt 34 and wall 36.

While in the embodiment illustrated in Fig. 1, by far the major portion of the gaseous material will be disengaged beneath troughs 46 and 47 and beneath the deep channels 45, a portion of the gaseous material flowing downwardly between the sides of the outermost channel members 45 and the skirt member 34 will be disengaged at the annular exposed surface of solid particles forming the lowermost boundary of the plenum 37.

Although it is contemplated that the quantity of disengaged gaseous material flowing laterally through the deep channels 45, whether or not it is supplemented by additional gaseous material introduced for stripping purposes in the lower region of the bed 38 and passing upwardly through the bed 38 into the spaces beneath the channels 45, will not be sufficient to cause entrainment of the solid particles and conveyance thereof through channels 45 into plenum 37, it is inevitable that some of the smaller-size particles will be entrained and carried into the plenum. Since the bed 38 forms the lower boundary of the plenum 37, the entrained particles which are carried into the plenum will settle to the peripheral surface of the bed 38, by reason of the decrease in gas velocity within the plenum. Since plenum 37 is preferably constructed to provide sufficient flow area to lower the velocity of the gases passing therethrough below the supporting velocity for all but the smallest-size particles of solid material, there is no serious problem arising from carry-over of the solids through conduit 51 to other portions of the system.

The described disengager structure advantageously permits a reduction in overall height for disengaging the gaseous material and conveying it laterally out of the confining vessel. It is a feature of the invention that substantially all the concurrently flowing gaseous material is disengaged from the solids and also removed from the vessel at locations either wholly within the lower region of the contact zone, or at the bottom of the contact zone. Furthermore, since the full weight of the disengager structure, together with the downward forces exerted by the moving bed 21 and the downwardly flowing gaseous material, is supported by the channels 45, which in turn are supported at their ends by skirt 34, the need for the usual supporting beams extending horizontally across the vessel below the disengager section is eliminated. The absence of obstructions across the vessel, such as are formed by the support beams heretofore usually employed, effects a saving in vertical height, since the space normally occupied by the beams may be utilized for other purposes.

Additional advantages obtained by the present disengager structure are ease of assemblage in the field and stability of structure after the parts are fixed in position. The latter feature is especially desirable when it is considered that any lateral displacement of adjacent channel members toward each other may cause a serious restriction or stoppage of the flow of solid particles therebetween, with resultant reflection of this disturbance of flow upwardly through the bed 21 within the contact zone.

Assemblage of the removable portions of the disengager structure may readily be effected, as will be apparent from an inspection of Figs. 2, 3 and 4 wherein the tops of the inverted troughs 46 and 47 are illustrated as being rigidly held in position by inverted T-shaped members 52 bolted, as at 53, to the flat tops of channels 46. Additional rigidity is provided by spacer bolts 54 at the bottom of channels 45, and by spacers 55, bolted as at 56, to lugs 57 formed at the top of channels 45.

It will be obvious to those skilled in the art that the invention is not limited to the number of levels of disengagement provided by troughs 46 and 47. It is contemplated that when a larger disengaging capacity is desired, additional levels of inverted troughs may be provided.

In order that the gas discharging downwardly from conduits 48 into channels 45 shall not disturb the exposed surfaces of bed 38, horizontal target plates 58 are provided below each conduit 48. The plates 58 are attached, as by welding, to the inner walls of channels 45, and serve to deflect the downwardly discharging streams of gas.

Fig. 5 shows an arrangement in which the disengager unit is located within a cylindrical vessel 20' having side walls of uniform diameter. In this modification there is no expansion of the bed in the lower region of the contact zone, such as that provided within the skirt 34 of Fig. 1, and the solid particles discharging from the lower end of the contact zone do not expand outwardly to form an outer peripheral exposed surface, as was the case in Fig. 1. In place of the plenum 37 of Fig. 1, a closed circumferential plenum 59 is formed about the exterior of the vessel 20' by concentrically spaced cylindrical member 60 and inwardly sloping upper and lower end members 61 and 62, respectively. Gaseous communication between vessel 20' and plenum 59 is provided only through the open ends of the deep channel members 45, which ends extend through and are rigidly supported within openings formed in the wall of vessel 20'. Since plenum 59 is outside vessel 20' and communicates therewith only through the open ends of channels 45, any entrained solids which are carried into the plenum will settle therein and accumulate as stagnant masses having their surfaces extending away from the open channel ends at the angle of repose for the particular solids. Should it be desired to avoid excessive accumulation of solids in the plenum, a drain conduit (not shown) may be provided in the bottom of the plenum to drain off the accumulation and either remove it from the system or convey it back into the downwardly moving stream of particles at some suitable location below. As in the case of the modification illustrated in Fig. 1, each disengaging level of the disengager shown in Fig. 5 carries a substantial share of the disengaging load, and the other advantages inherent in the embodiment of Fig. 1 are obtained also in the embodiment of Fig. 5.

While each of the embodiments of the invention illustrated in Figs. 1 and 5 disclose a plenum formed about the lower periphery of the contact zone, it is to be understood that the invention is not so limited. As shown in Figs. 6 and 7, for example, a hollow central beam 63 having lateral disengaging channel members 64 normal to the axis of the central beam may be employed. The central beam 63 extends diametrically across the vessel at the bottom of the contact zone, only a fragmentary portion of the vertical side wall being shown. Deep channel disengager elements 64 are arranged on either side of central beam 63, normal to the axis thereof. The ends of deep channels 64 are supported by short channel sections 65 adapted to nest within and support the end portions of the deep channels 64. The inner channel support members 65 extend through and are secured within openings 66 provided in the side walls of the central beam 63, thereby forming both a support for the deep channel member and a conduit for conveying disengaged gas from the particle-free hollow space beneath the channel into the hollow central beam 63. The outer channel support members 65 are secured, as by welding, to the inner surface of the vessel wall 67. Additional disengager elements, such as the elements 46 and 47 of Figs. 1 and 4, may be supported in a manner similar to that shown in Figs. 1 and 4 from the upper side of the deep channels 64. For convenience, only the lower ends of the connecting conduits 48 are shown in Figs. 6 and 7. In order that substantially all the gaseous material passing downwardly on either side of the deep channels 64 may be disengaged from the solid particles at a common level containing the lower edges of all the channels, an end plate or baffle 68 is placed adjacent the outer end of each deep channel 64 inwardly from the point where it is supported by its associated member 65, and a narrow plate or baffle 69 is placed across the inner end of each channel 64 to substantially close off the portion of the channel extending below the lower edges of the support member 65.

The arrangement shown in Figs. 6 and 7 provides a simplified structure which may readily be assembled in the field. The deep channel members 64 may easily be inserted or removed without dismantling the internal supporting structure. Thus a channel 64 is easily inserted by first lowering its inner end and sliding it over the inner support member 65, the latter being inserted within the opening provided between the top and side portions of the channel 64 and the upper edge of baffle 69. The outer end of the channel 64 is then merely dropped into nesting position over the outer support member 65.

The gaseous material disengaged at the exposed surfaces of the flowing mass of solid particles beneath deep channel members 64 is conveyed from the particle-free collecting space under the channel, together with gaseous material disengaged at the upper disengaging levels within the contact zone and conveyed into the channels 64 through conduits 48, into the hollow central beam 63 through the side openings 66, shown in Fig. 7. The total disengaged gaseous material discharging from all the deep channel members 64 into the central beam 63 is passed out of the latter through a conduit 70, one such being located preferably at each end of the hollow beam.

While the invention has been illustrated and described as embodying elongated trough members 46 and 47 in the upper levels of disengagement, it is to be understood that the inverted troughs may be replaced by a plurality of inverted cup-shaped members of the type illustrated in Fig. 3 of the article entitled "Commercial TCC operations on partially vaporized charge stocks," appearing in the "Houdry Pioneer," volume 2, No. 1, page 7, October 1946. Alternatively, additional disengaging capacity supplementing that provided by deep channels 45 may be provided by disposing additional inverted troughs transversely between the deep channels 45, such additional troughs horizontally spanning the spaces between the sides of adjacent channels 45 and being in open communication at each end with the particle-free spaces under the deep channels, as disclosed and claimed in copending application Serial No. 163,870, now Patent No. 2,628,893, filed concurrently herewith in the name of Reyner Kollgaard.

If desired, the inverted T-shaped beams 52 extending across the top of the whole disengager structure may be omitted, and rigidity of the structure may be provided by arranging either the upper or the lower level of inverted troughs 46 and 47, preferably the former, in a direction normal to that shown in the drawings. That is, inverted troughs 46 or 47 may be positioned at a right angle with respect to deep channels 45. Such arrangement provides rigid support for the entire structure, and prevents lateral movement of the troughs in two horizontal directions. Alternatively, inverted troughs 46 and 47 may be arranged in staggered relation, that is with the troughs of adjacent vertical rows of troughs staggered. In any case, however, the vertical spacing between channels and troughs and between the adjacent troughs connected to the same conduit 48 is such as to provide a rapid rate of catalyst flow directly under the troughs. Other modifications of the basic structure will be apparent to those skilled in the art from the description herein given.

Obviously many modifications and variations of the invention as hereinbefore set forth may be made without departing from the spirit and scope thereof and therefore only such limitations should be imposed as are indicated in the appended claims.

This application is a continuation-in-part of our application Serial No. 164,004, filed May 24, 1950, now abandoned.

What is claimed is:

1. Apparatus for contacting gaseous material with granular contact material comprising; an upright elongated vessel adapted to contain a compact moving mass of said contact material flowing concurrently downward with said gaseous material; a plurality of inverted deep channel members having at least a 3 to 1 ratio of depth to average width horizontally positioned and uniformly distributed throughout a common intermediate level within said vessel and supported from the walls thereof, the level of the lowermost edges of said deep channel members dividing said vessel into an upper contact zone and a lower disengaging zone; means arranged to provide a plenum chamber at said intermediate level of said vessel, means for providing lateral gaseous communication between said plenum and said deep channel members; a plurality of gas disengaging members uniformly distributed throughout each of one or more separate levels spaced above said deep channel members; a plurality of conduits extending upwardly from said channel members and supporting said disengaging members, said conduits having their lower ends in open communication with said deep channel members and their upper portions in restricted open communication with said disengaging members, said restricted open communication with said disengaging members being such that fractional portions of the total gaseous material passing downwardly through said contact zone are disengaged from the compact moving mass at each of the successive levels of disengaging members and a substantial remaining portion of gaseous material is disengaged from said mass at the bottom of said contact zone and collected within said deep channel members, said conduits being arranged and adapted to receive said portions of gaseous material collected by the disengaging members at the upper disengaging levels and to convey the same downwardly into said deep channel members, the cross-sectional flow area of said deep channel members being such as normally to convey the total disengaged gaseous material laterally into said plenum chamber at a velocity insufficient to effect any substantial entrainment of said granular contact material; and means for discharging gaseous material from said plenum chamber.

2. Apparatus as defined in claim 1, in which said plenum is of such size as normally to convey the total gaseous material therethrough at a velocity less than the supporting velocity of said contact material.

3. Apparatus, as defined in claim 2, in which said plenum comprises a peripheral chamber surrounding said contact zone.

4. Apparatus, as defined in claim 2, in which said plenum comprises a horizontal conduit extending centrally across the bottom of said contact zone.

5. Apparatus, as defined in claim 2, in which said deep channel members are parallel and have their ends extending through the walls of said vessel, said deep channel members being laterally spaced to provide deep narrow passages, extending the full width of said contact zone, from which said granular contact material is discharged into said disengaging zone, said vessel being adapted to contain said compact moving mass of contact material in the form of broad undivided beds in the region above the uppermost level of said disengaging members and in the region below said deep channel members.

6. Apparatus as defined in claim 1, in which said disengaging members comprise relatively-shallow channel members extending horizontally across said vessel, the relatively-shallow channel members at each level being equal in number to said deep channel members and being arranged so that each of the latter collects gaseous material from a shallow channel member at each of the upper disengaging levels.

7. Apparatus as defined in claim 6, in which the shallow channel members associated with each deep channel member are in vertical alignment therewith.

8. Apparatus as defined in claim 1, in which the portion of said vessel comprising said disengaging zone is of greater horizontal dimension than the portion comprising said contact zone and contains the lower end portion of said contact zone, the annular space between the interengaging vessel portions forming said plenum chamber, the lowermost boundary of said plenum chamber being defined by an annular exposed peripheral surface of said compact moving mass as it flows outwardly to form an expanded bed within said disengaging zone.

9. Apparatus as defined in claim 1, in which said deep channel members are of a depth in the order of about 3 to 10 times their average width.

10. Apparatus as defined in claim 1, including means for introducing purge gas into said compact moving mass at the bottom of said disengaging zone.

11. Apparatus for contacting gaseous material with fluent solid particles which comprises: a contact chamber having an open lower end; means for introducing said solid particles into the upper region of said contact chamber; means for introducing said gaseous material into the upper region of said chamber; means below said open lower end and fixed with respect to said contact chamber for supporting said solid particles as a gravitating compact mass extending upwardly into said contact chamber and terminating in the upper region thereof; and means at the lower end of said contact chamber for disengaging said gaseous material from said solid particles and removing said gaseous material from said apparatus; said last-mentioned means comprising a peripheral manifold chamber surrounding the lower end portion of said contact chamber; a plurality of parallel, inverted, relatively-deep channel members extending horizontally across said open lower end to and through the opposite walls of said contact chamber, the ends of said deep channel members being in open communication with said peripheral manifold chamber; said parallel deep channel members being arranged in close lateral spacing so that said solid particles gravitate therebetween as a plurality of parallel, narrow, confined, compact streams extending the width of said contact chamber; a plurality of inverted hollow members uniformly distributed throughout one or more levels within said contact chamber located above said deep channel members; upwardly extending conduits having their lower ends set in and communicating with said deep channel members and their upper portions supporting said hollow members, said conduits being in such restricted open communication with said hollow members as to effect only partial disengagement of said gaseous material at each level of hollow members whereby residual disengagement thereof is effected at the level of said deep channel members.

12. Apparatus as defined in claim 11, in which the depth of said deep channel members is at least 3 times their average width.

13. Apparatus as defined in claim 12, in which the depth of said deep channel members is in the order of about 3 to 10 times their average width.

14. Apparatus as defined in claim 11, in which said inverted hollow members are in the form of channels which extend substantially the full width of said contact chamber.

References Cited in the file of this patent

UNITED STATES PATENTS

| | | |
|---|---|---|
| 2,400,194 | Day et al. | May 14, 1946 |
| 2,459,096 | Ray | Jan. 11, 1949 |
| 2,526,625 | Ardern | Oct. 24, 1950 |
| 2,566,285 | Evans et al. | Aug. 28, 1951 |
| 2,574,489 | Lassiat et al. | Nov. 13, 1951 |
| 2,574,850 | Utterback et al. | Nov. 13, 1951 |